(12) United States Patent
Lai et al.

(10) Patent No.: US 6,445,812 B1
(45) Date of Patent: Sep. 3, 2002

(54) ILLUMINATION COMPENSATION SYSTEM FOR INDUSTRIAL INSPECTION

(75) Inventors: Shang-Hong Lai, Plainsboro; Ming Fang, Cranbury, both of NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/235,997

(22) Filed: Jan. 22, 1999

(51) Int. Cl.[7] .................................................. G06K 9/00
(52) U.S. Cl. ........................................ 382/141; 382/145
(58) Field of Search .................................. 382/141, 142, 382/143, 144, 145, 146, 147, 190, 110, 164

(56) References Cited

U.S. PATENT DOCUMENTS 4,707,119 A * 11/1987 Terashita ..................... 355/38
5,546,475 A * 8/1996 Bolle et al. ................. 382/190
5,619,587 A * 4/1997 Willoughby, Jr. et al. .. 382/141
5,774,573 A * 6/1998 Caspi et al. ................. 382/141

\* cited by examiner

Primary Examiner—Andrew W. Johns
Assistant Examiner—Seyed Azarian
(74) Attorney, Agent, or Firm—Donald B. Paschburg

(57) ABSTRACT

An illumination compensation system for correcting smooth intensity variations due to illumination changes is based on an assumption that an underlining image reflectance function is approximately a piecewise constant and that an image irradiance function is spatially smooth. The system first takes the logarithm of an image brightness function. Gradient constraints are then computed using a finite difference. Reliable gradient constraints are selected based on a local uniformity test. A process is subsequently applied to estimate the logarithmic irradiance function. A logarithmic irradiance function is subtracted from the logarithmic image brightness function and an exponential operation of the above subtracted image function is taken and an illumination compensated image is outputted from the system.

21 Claims, 4 Drawing Sheets

ILLUMINATION COMPENSATION SYSTEM FOR INDUSTRIAL INSPECTION

BACKGROUND OF THE INVENTION

1. Field of the Invention

The resent invention relates to improving images for inspection purposes and more particularly to applying an illumination compensation to the images to correct smooth intensity variations due to illumination changes.

2. Description of the Prior Art

Automatic visual inspection of parts for defect detection in the manufacturing process is one of the most important applications in machine vision. The performance of an automatic visual inspection system can be determined by its reliability, efficiency and generality. An automatic inspection system needs to be reliable under different illumination conditions and under noisy environments. The reliability of an inspection system, which is usually characterized by its false alarm rate, is very crucial to the quality control in the manufacturing process. The efficiency of an automatic inspection system is also important since it is directly related to the throughput of the production. In addition, the automatic inspection system should be general enough to perform different kinds of inspection tasks.

A number of methods have been proposed for automatic visual inspection. These are described by R. T. Chin in "Automatic Visual Inspection: 1981 to 1987", Computer Vision, Graphics, and Image Processing, Vol. 41, No. 3, pp. 346–381, 1988; by T. S. Newman and A. K. Jain in "A Survey Of Automatic Visual Inspection", Computer Vision and Image Understanding, Vol. 61, No. 2, pp. 231–262, 1995; and by B. E. Dom and V. Brecher in "Recent Advances In The Automatic Inspection Of Integrated Circuits For Pattern Defects", Machine Vision and Applications, Vol. 8, pp. 5–19, 1995. They can be roughly categorized into two approaches namely, the image reference approach and the design-rule verification approach. The image reference or image subtraction approach compares every pixel in the inspection image with the corresponding pixel in the reference image, which is sensed defect-free image or a synthetically generated image from a CAD model. The design-rule verification approach checks for the violation of a set of generic rules, such as design width and spacing standards, in the image. The image reference approach is very popular in automatic visual inspection due to its general applicability to a wide variety of different inspection tasks. However, it requires very precise alignment of the inspection pattern in the image. Although the design-rule verification approach does not need very accurate alignment, it usually requires a complicated system design for each individual inspection task, which makes it more difficult to use in practice.

A major problem with the prior art image reference approaches are their sensitivity to illumination changes. An image reference inspection system usually requires the same illumination condition during the inspection. Different illumination conditions may lead to large deviation between the inspection image and the reference image. This deviation may occur all over the image domain. Thus the existing, prior art, image reference system is not robust against illumination changes.

It is an object of the present invention to provide a novel and automatic illumination compensation system which can lead to a reliable image reference inspection system that is robust against illumination changes.

SUMMARY OF THE INVENTION

The present invention is an illumination compensation system for correcting smooth intensity variations due to illumination changes. The present invention is very useful in achieving a reliable automated visual inspection system under different illumination conditions.

The illumination compensation system of the present invention includes the following. An image brightness functions inputted to a take LOG operator where the logarithm of the image brightness function is taken. In a gradient constraints computer the gradient constraints are computed using a finite difference. In a reliable constrains selector the reliable gradient constraints are selected based on a local uniformity test. In a surface fitting processor a process is subsequently applied to estimate the logarithmic irradiance function. In an image subtractor the logarithmic irradiance function is subtracted from the logarithmic image brightness function. Finally, in a take exponential operator, the exponential operation of the above subtracted image function is taken and the illumination compensated image is outputted from the system.

DETAILED DESCRIPTION OF THE INVENTION

The image reference approach is very popular in industrial inspection due to its generality for different inspection tasks. Unfortunately, this approach is sensitive to illumination variations. The present invention provides an illumination compensation system for correcting smooth intensity variations due to illumination changes. By using the present invention as a pre-processing step in the image reference based inspection or localization, the image inspection or localization is made more robust against spatially smooth illumination changes.

Figure 1:
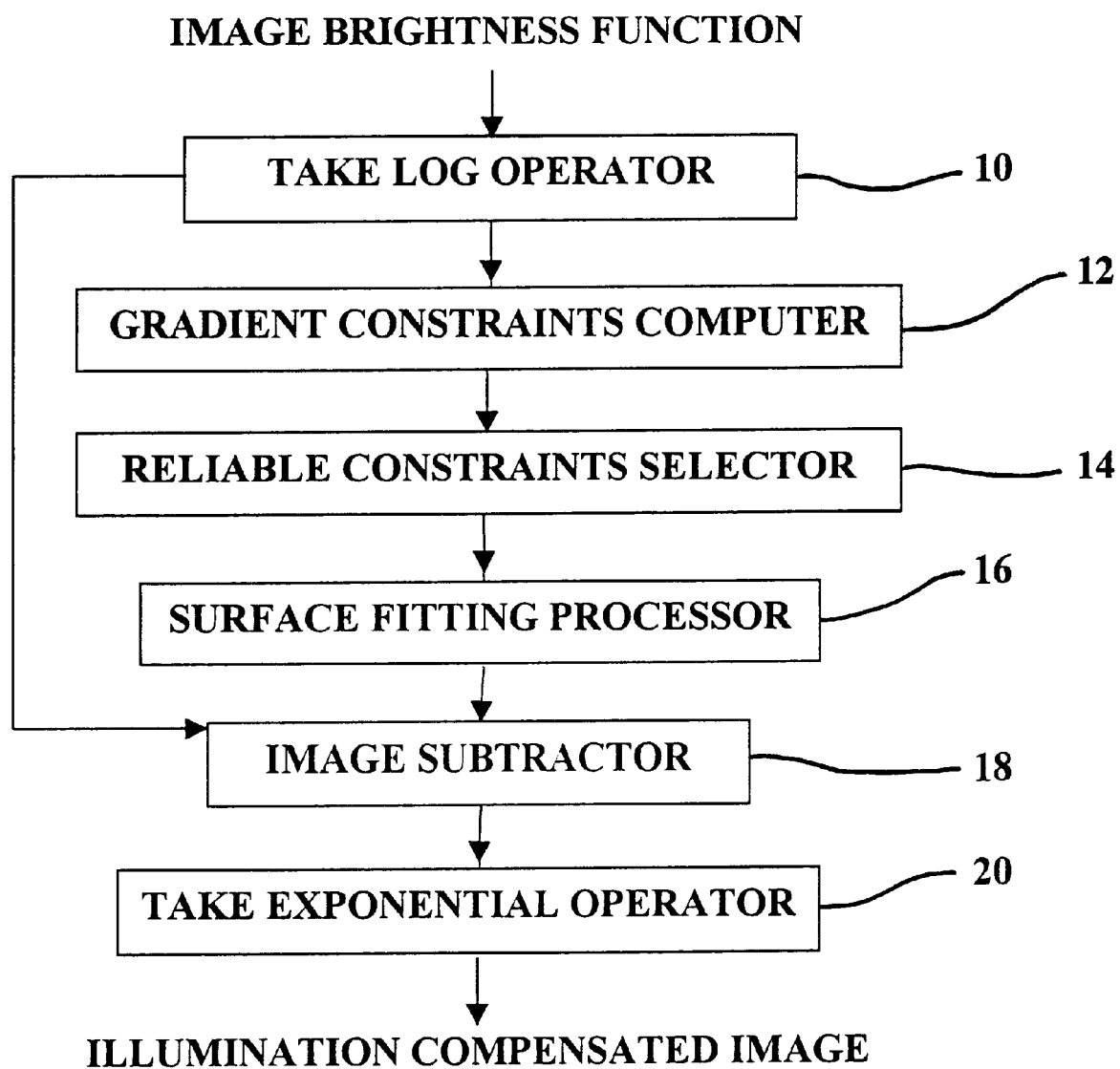
FIG. 1 illustrates a flow chart of the present invention.

The flow chart of the illumination compensation system of the present invention is shown in FIG. 1. The image brightness function is inputted to the take LOG operator 10 where the logarithm of the image brightness function is taken. Then in gradient constraints computer 12, the gradient constraints are computed using finite difference. In reliable constraints selector 14, reliable gradient constraints are selected based on a local uniformity test. In surface fitting processor 16, a process is subsequently applied to estimate the logarithmic irradiance function. In image subtractor 18, the logarithmic irradiance function is subtracted from the logarithmic image brightness function. Finally, in take exponential operator 20, the exponential operation of the above subtracted image function is taken and the illumination compensated image is outputted from the system.

The present invention is based on the assumption that the underlining image reflectance function is approximately a piecewise constant and that the image irradiance function is spatially smooth. Within reliable constraints selector 14, reliable gradient constraints on the smooth irradiance function are computed and selected from the image brightness function by using a local uniformity test. Within surface fitting processor 16, two surface fitting systems are presented to recover the smooth image irradiance function from the elected reliable gradient constraints found in gradient constraints computer 12. One is a polynomial surface fitting system and the other is a spline surface fitting system. The spline surface fitting formulation leads to solving a large linear system, which is accomplished by an efficient preconditioned conjugate gradient system. Once the image irradiance function is estimated, the spatial intensity inhomogeneities can be easily compensated.

The following will describe the illumination compensation system using surface fitting processor 16. The image brightness value $b(x,y)$ at a location $(x,y)$ is related to the product of the irradiance $e(x,y)$ and image reflectance $r(x,y)$ as follows:

$$b(x,y) = e(x,y) r(x,y) \tag{1}$$

This is further described by B. K. P. Horn in *Robot Vision*, MIT Press, Cambridge, Mass., 1986. Note that irradiance denotes the power per unit area of radiant energy falling on a surface, while reflectance is the percentage of the light reflected by the objects in the scene. Thus the irradiance function directly relates to the illumination condition, and the reflectance function depends on the physical property of the objects. It is assumed that the irradiance function is spatially smooth in the image domain and the reflectance function is approximately a piecewise constant. The above assumption is valid for many industrial inspection environments.

To compensate for the image brightness variations due to illumination inhomogeneities, the irradiance function is estimated from the observed image data and the non-uniform irradiance component is removed from the image brightness function. To estimate the irradiance function, logarithmic operations on both sides of equation (1) are calculated. This yields $$b'(x,y) = e'(x,y) + r'(x,y) \tag{2}$$

where $b'(x,y) = \log b(x,y)$, $e'(x,y) = \log e(x,y)$ and $r'(x,y) = \log r(x,y)$. This logarithmic operation converts the multiplicative relationship between the irradiance function and reflectance function into an additive one. This is used to simplify the problem of estimating the irradiance function from the image function.

By using the assumption that the reflectance function $r(x,y)$ is a piecewise constant, it is possible to derive the following gradient constraints for the irradiance function at the locations inside the regions of uniform reflectance values, i.e.

$$\frac{\partial e'(x,y)}{\partial x} \cong \frac{\partial b'(x,y)}{\partial x} \tag{3}$$

$$\frac{\partial e'(x,y)}{\partial y} \cong \frac{\partial b'(x,y)}{\partial y} \tag{4}$$

The partial derivatives of $b'(x,y)$ appearing on the right-hand sides of equation (3) and (4) can be computed via finite difference method. The selection of the gradient constraints at the locations inside regions of uniform reflectance is facilitated by a local uniformity test that determines if the pixels in a local neighborhood belong to the same object with a uniform reflectance value. This local uniformity test is accomplished by checking the variance as well as the goodness of fit using a first-order polynomial.

Combining the above gradient constraints and the smoothness assumption on the logarithmic irradiance function $e'(x,y)$, this function can be estimated by using surface fitting techniques. A polynomial surface fitting system and a spline surface fitting system for recovering the logarithmic irradiance function will be described below.

After the logarithmic irradiance function $e'(x,y)$ is estimated, the image reflectance function $r(x,y)$ is computed using the following equation $$r(x,y) = \exp(b'(x,y) - e'(x,y)) \tag{5}$$

The image reflectance function is the modified intensity function with the non-uniform illumination factor, i.e. irradiance function, removed from the image brightness. Therefore, it can be considered the illumination compensated function.

The following will describe the two surface fitting systems, of surface fitting processor 16, for recovering the smooth irradiance function from the selected gradient constraints. One is a polynomial surface fitting system and the other is a spline surface system. The former is more efficient than the latter, while the latter is more powerful in recovering different shapes of irradiance surface than the former.

With the polynomial surface fitting system, since the irradiance function is assumed to be spatially smooth, it can be approximated by a low order polynomial function. For example, the approximation of irradiance function using a second-order polynomial function can be written as $$e'(x,y) \approx a_5 x^2 + a_4 xy + a_3 y^2 + a_2 x + a_1 y + a_0 \tag{6}$$

where the coefficient vector $(a_5, a_4, a_3, a_2, a_1, a_0)$ characterizes the shape of the irradiance function.

Substituting equation (6) into equations (3) and (4), the constraints for the polynomial coefficient vector $(a_5, a_4, a_3, a_2, a_1, a_0)$ are obtained as follows:

$$2 a_5 x + a_4 y + a_2 = b_x'(x,y) \tag{7}$$

$$a_4 x + 2 a_3 y + a_1 = b_y'(x,y) \tag{8}$$

Combining all the constraints at the selected locations leads to the minimization of the following energy function $$E(a_5, a_4, a_3, a_2, a_1) = \tag{9}$$
$$\sum_i (2 a_5 x_i + a_4 y_i + a_2 - b_x'(x_i, y_i))^2 + (a_4 x_i + 2 a_3 y_i + a_1 - b_y'(x_i, y_i))^2$$

This energy function can be minimized via solving the following linear system.

$$\begin{pmatrix} 4\sum_i x_i^2 & 2\sum_i x_i y_i & 0 & 2\sum_i x_i & 0 \\ 2\sum_i x_i y_i & \sum_i(x_i^2+y_i^2) & 2\sum_i x_i y_i & 2\sum_i y_i & \sum_i x_i \\ 0 & 2\sum_i x_i y_i & 4\sum_i y_i^2 & 0 & 2\sum_i y_i \\ 2\sum_i x_i & 2\sum_i y_i & 0 & n & 0 \\ 0 & \sum_i x_i & 2\sum_i y_i & 0 & n \end{pmatrix} \begin{pmatrix} a_5 \\ a_4 \\ a_3 \\ a_2 \\ a_1 \end{pmatrix} = \begin{pmatrix} 2\sum_i x_i b'_x(x_i, y_i) \\ \sum_i (y_i b'_x(x_i, y_i) + x_i b'_y(x_i, y_i)) \\ 2\sum_i y_i b'_y(x_i, y_i) \\ \sum_i b'_x(x_i, y_i) \\ \sum_i b'_y(x_i, y_i) \end{pmatrix} \quad (10)$$

This linear system can be solved simply by Gaussian elimination method. This is described by G. H. Golub and C. F. Van Loan in Matrix Computations, The Johns Hopkins University Press, Second Edition, 1989. Once the coefficients $a_1, K, a_5$ are solved, the polynomial irradiance function $e'(x,y)$ is recovered up to a constant. This is due to the gradient constraints do not constrain the zero-order coefficient $a_0$. However, the coefficient $a_0$ can be chosen such that the sum of the irradiance function all over the image domain is zero, i.e.

$$\sum_i e'(x_i, y_i) = 0.$$

Then, in image subtractor 18, the illumination non-uniformity is compensated by subtracting the estimated polynomial irradiance function $e'(x,y)$ from the logarithmic image brightness function $b'(x,y)$. Finally, in take exponential operator 20, an exponential operation is taken on the illumination compensated logarithmic image to obtain the corrected image. This illumination compensation system of the present invention is beneficial to achieve a robust visual inspection system working under different illumination conditions.

With the spline surface fitting system of surface fitting processor 16, the regularization formulation for the shape from orientation problem is to find the function $S'(x,y)$ that minimizes the following energy functional $$U(e') = \qquad (11)$$

$$\int\int_\Omega \alpha(x,y)\left\{\left(\frac{\partial e'(x,y)}{\partial x} - p(x,y)\right)^2 + \left(\frac{\partial e'(x,y)}{\partial x} - q(x,y)\right)^2\right\} + \lambda\left\{\left(\frac{\partial e'(x,y)}{\partial x^2}\right)^2 + 2\left(\frac{\partial^2 e'(x,y)}{\partial x \partial y}\right)^2 + \left(\frac{\partial^2 e'(x,y)}{\partial y^2}\right)^2\right\}dxdy$$

Where $\Omega$ is the image domain, $\alpha(x,y)$ is a constraint selection function that assigns value 1 in the smooth regions and value 0 in the high gradient regions, $p(x,y)$ and $q(x,y)$ are the partial derivatives of $b'(x,y)$ with respect to x and y respectively, and $\lambda$ is the regularization parameter controlling the degree of smoothness. Note that the second integral corresponds to the thin-plate smoothness imposed on the function $e'(x,y)$. This is described by D. Terzopoulos in "Multilevel Computational Processes For Visual Surface Reconstruction", Computer Vision, Graphics, Image Processing, Vol. 24, pp.52–96, 1983; and by D. Terzopoulos in "The Computation Of Visible-surface Representation", IEEE Trans. Pattern Analysis Machine Intelligence, Vol. 10, No. 4, pp. 417–438, 1988. This is used to enforce the continuity in the first-order derivatives for a smooth function. Below, the variational principle is discretized via a finite element technique and it is shown that the minimization problem leads to solving a linear system.

Figure 2:
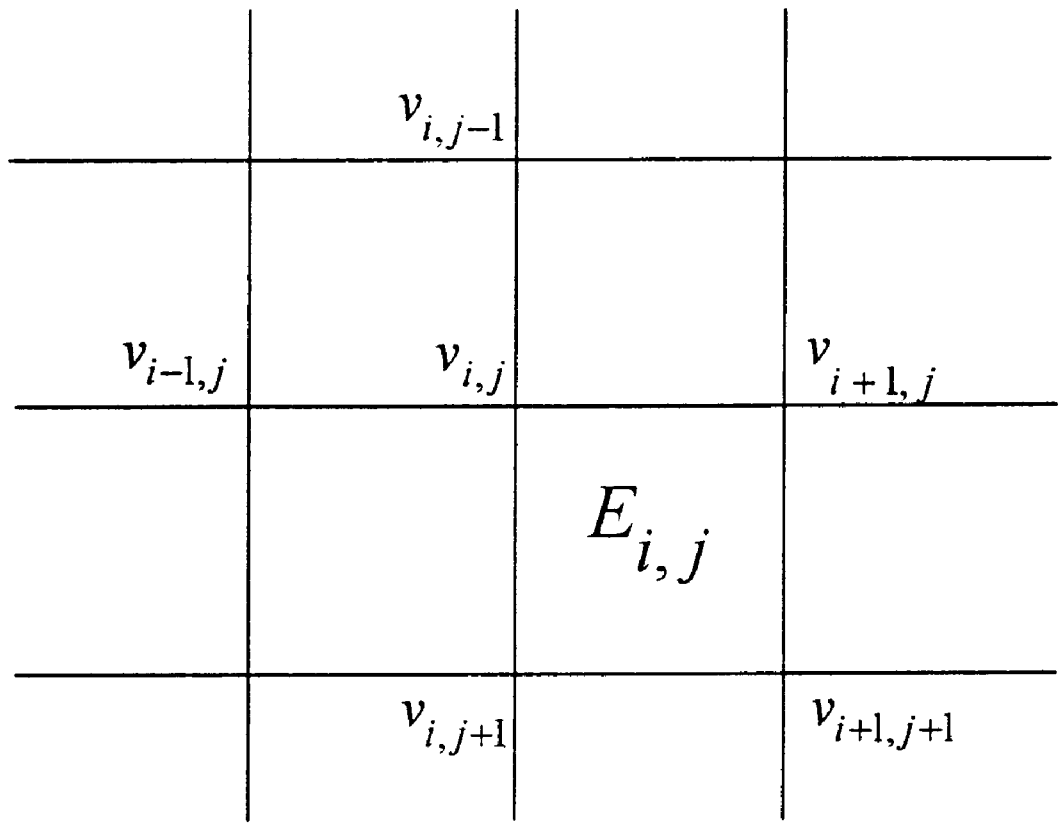
FIG. 2 illustrates a square non-conforming finite element $E_{i,j}$ that the element basis function is a second-order polynomial with coefficients determined by its neighboring nodal variables.

Throughout this specification, a non-conforming finite element basis to represent the image irradiance function $e'(x,y)$ is shown and the energy functional given in equation (11) is discretized. The non-conforming finite element representation for a two-dimensional function consists of uniformly tessellating the original rectangular domain $\Omega$ into identical square elements $E_{i,j}$, for i=1,K,m and j=1,K,n. A nodal variable $v_{i,j}$ is assigned at each vertex of an element square as shown in FIG. 2. In each element $E_{i,j}$, a second-order polynomial function $p_{i,j}(x,y)$ is defined as follows $$p_{i,j}(x,y) = ax^2 + bxy + cy^2 + dx + ey + f, \qquad (12)$$

where the coefficients are given by $$a = \frac{1}{2h^2}(v_{i+1,j} - 2v_{i,j} + v_{i-1,j}), \quad b = \frac{1}{h^2}(v_{i+1,j+1} - v_{i,j+1} - v_{i+1,j} + v_{i,j})$$

$$c = \frac{1}{2h^2}(v_{i,j+1} - 2v_{i,j} + v_{i,j-1}), \quad d = \frac{1}{2h}(v_{i+1,j} - v_{i-1,j})$$

$$e = \frac{1}{2h}(v_{i,j+1} - v_{i,j-1}), \qquad f = v_{i,j}$$

Note that the finite element function given in equation (12) is represented in a local x-y coordinate with the origin shifted to the nodal location of $v_{i,j}$. The logarithmic image irradiance function $e'(x,y)$ can be approximated by a linear combination of the non-conforming finite element basis as follows $$e'(x, y) = \sum_{i=1}^m \sum_{j=1}^n v_{i,j} p_{i,j}(x - ih, y - jh) \qquad (13)$$

Substituting $e'(x,y)$ in the energy functional $U(e')$ by equation (13), the discretized energy function E is given as follows $$E(v) = \sum_{i=1}^m \sum_{j=1}^n \alpha_{i,j}\left\{\left(\frac{v_{i+1,j} - v_{i-1,j}}{2h} - b'_x(ih, jh)\right)^2 + \right. \qquad (14)$$
$$\left(\frac{v_{i,j+1} - v_{i,j-1}}{2h} - b'_y(ih, jh)\right)^2 \right\} +$$
$$\frac{\lambda}{h^2}\{(v_{i+1,j} - 2v_{i,j} + v_{i-1,j})^2 + 2(v_{i+1,j+1} - v_{i+1,j} - v_{i,j+1} + v_{i,j})^2 +$$
$$(v_{i,j+1} - 2v_{i,j} + v_{i,j-1})^2\}$$

where the vector v is a concatenation of all the nodal variables $v_{i,j}$, $b_x'$ and $b_y'$ are the first-order partial derivatives of $b'(x,y)$ along x and y directions, respectively. In this specification, the orientation constraint selection function $\alpha_{i,j}$ is determined from the goodness of fitting the data b'(x,y) in the neighborhood of the nodal location (i,j) by a first-order polynomial. The orientation constraint at a nodal point is selected when the fitting error in the neighborhood of this point is less than a threshold. This is because the image reflectance function r(x,y) is assumed to be a piecewise constant and the logarithmic image irradiance function e'(x,y) is very smooth. The locations that are not well fitted by a first-order polynomial in their neighborhoods are very likely close to the edges between different class regions. On the contrary, the neighborhoods of the locations corresponding to small fitting errors should be inside the same class regions. The fitting error can be further utilized to indicate a confidence measure for the orientation constraints selected at the locations in Z. A confidence measure $\alpha_{i,j}$ can be assigned for the average fitting error $err_{i,j}$ at the node (i,j) as follows $$\alpha_{i,j} = \frac{c}{c + err_{i,j}} \quad (15)$$

where c is a positive constant. For the present, the constant c is empirically set to 0.1.

The energy function E(v), given in Eq. (14), is a convex and quadratic function of the vector v. The minimization of this energy function can be achieved by solving a linear system Av=b, where $A \in \mathfrak{R}^{mn \times mn}$ is a large, sparse and symmetric positive semi-definite matrix and b is an mn×1 vector. The matrix A can be formed from the computational molecules. After solving the linear system for the vector v, the logarithmic image irradiance function can be obtained from the finite element basis representation given in equation (13). The following section will present an adaptive preconditioned conjugate gradient system to solve this linear system efficiently.

With a preconditioned conjugated gradient system, the finite element discretization of the variational formulation leads to solving the linear system Av=b, where the matrix A is large, sparse and symmetric positive semi-definite. The matrix A is a singular matrix with rank-1 deficiency. Since the null space of the matrix A is the set of vectors with identical entries, the solution to this linear system can be obtained up to a constant elevation. This is due to the fact that the factorization of the image intensity function b(x,y) into a smooth image irradiance function e(x,y) and an approximately piecewise image reflectance function r(x,y) is not unique. Another pair of solutions {ae(x,y),r(x,y)/a} can always be found for a positive constant a($\neq$1). To resolve this ambiguity, the minimum norm solution to the above linear system is taken, i.e. the projection of the solution onto the null space of A is zero. This minimum solution corresponds to the assumption that the sum of all the compensated intensity values r'(x,y) is the same as the sum of all the original values. This can be interpreted as an assumption for the preservation of the sum of intensity values before and after correction.

Although the matrix A is sparse, it is not tightly banded. Its bandwidth is roughly O(m)or O(n). Iterative methods are better suited than direct methods for solving this type of linear systems, since direct methods require the formation of intermediate matrices which are not necessarily sparse. This is described by J. Stoer and R. Bulirsch in *Introduction to Numerical Analysis*, Springer-Verlag, Second Edition, 1993. More precisely, the matrix factorization schemes involved in the direct methods produce intermediate matrices that are triangular and whose bandwidths are no larger than the bandwidth of the original matrix. However, fill-in does occur within the band after the matrix factorization for the 2D and higher dimensional problems. This can cause the number of operations and the amount of storage too expensive for 2D and higher dimensional problems. The present invention uses an adaptive preconditioned conjugate gradient system to solve the large and sparse linear system.

For the symmetric positive semi-definite matrix A, the conjugate gradient system can be used to solve the problem. When a positive-definite preconditioner P is used to accelerate the convergence, it is known as the preconditioned conjugate gradient (PCG) system given as follows.
1. Choose an initial $v_0$, and compute $r_0 = b - Av_0$; set k=0.
2. Solve $Pz_k = r_k$; k=k+1.
3. If k=1, $p_1 = z_0$; else compute $$\beta_k = \frac{\alpha_{k-1}^N}{r_{k-2}^T z_{k-2}}$$

and update $$p_k = z_{k-1} + \beta_k p_{k-1}.$$

4. Compute $\alpha_k^N = r_{k-1}^T z_{k-1}$, $\alpha_k^D = p_k^T A p_k$ and $$\alpha_k = \frac{\alpha_k^N}{\alpha_k^D}.$$

5. Update $r_k = r_{k-1} - \alpha_k A p_k$ and $v_k = v_{k-1} + \alpha_k p_k$.
6. If $r_k \approx 0$, stop; else go to step 2.

This is further described by G. H. Golub and C. F. Van Loan in *Matrix Computations*, The Johns Hopkins University Press, Second Edition, 1989. The present invention uses an adaptive wavelet preconditioner to accelerate the convergence of the PCG system. This is described by S.-H. Lai and B. C. Vemuri in "Physically Based Adaptive Preconditioning For Early Vision", IEEE Trans. Pattern Analysis Machine Intelligence, Vol. 19, No. 6, pp. 594–607, 1997. This adaptive preconditioner is constructed based on approximating the spectral characteristics of the matrix A. The matrix A consists of two components namely, one component matrix from the discretization of the orientation constraints and the other from the thin-plate smoothness. By integrating the spectral characteristics of these two component matrices, an approximate spectral function for the matrix A can be obtained. This spectral function is used to modulate the frequency characteristics of a chosen wavelet basis and these modulated values are then used in the construction of the preconditioner. The preconditioner is constructed in a wavelet basis and the motivation for using a wavelet basis as opposed to the Fourier basis is primarily computational. The computation for constructing the preconditioner can be achieved with O(N) operations in a wavelet basis unlike the O(N log N) computational complexity required for a Fourier basis, where N is the total number of discretization nodes.

Figure 3A:
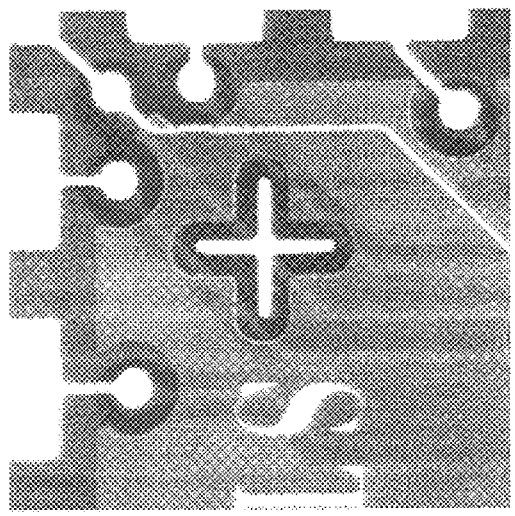
FIG. 3 illustrates (a) a reference image, (b) an inspection image, (c) a difference image without illumination compensation, and (d) a difference image with the illumination compensation system applied before image subtraction.
Figure 3B:
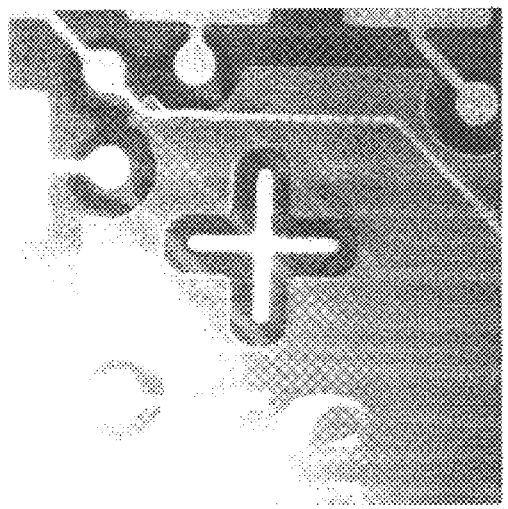
Figure 3C:
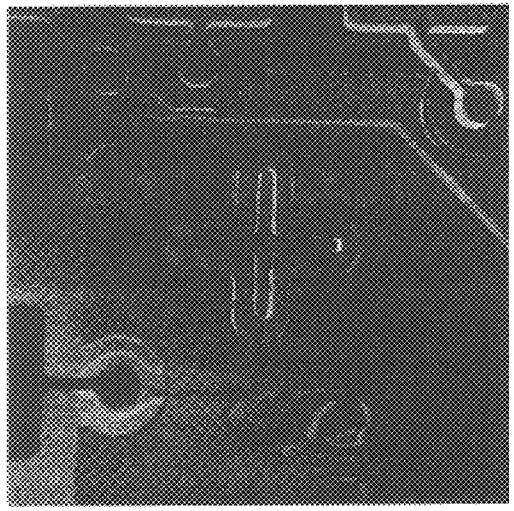
Figure 3D:
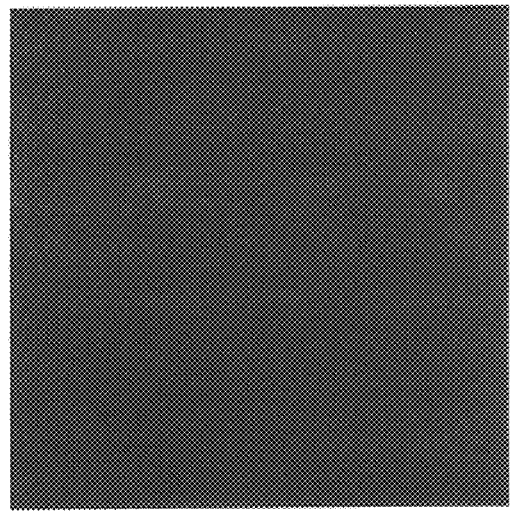
Figure 4A:
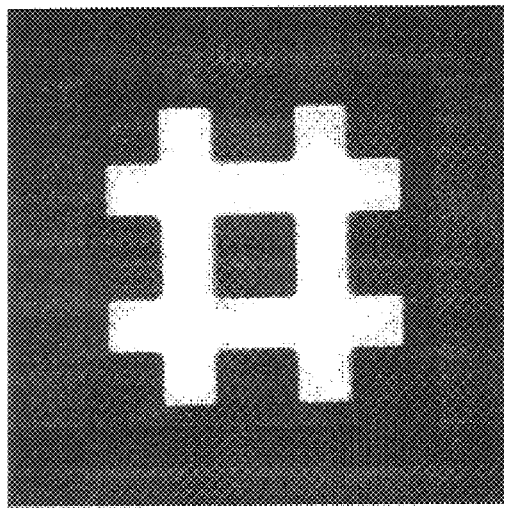
FIG. 4 illustrates (a) a reference image, (b) an inspection image, (c) a difference image without illumination compensation, and (d) a difference image with the illumination compensation system applied before image subtraction.
Figure 4B:
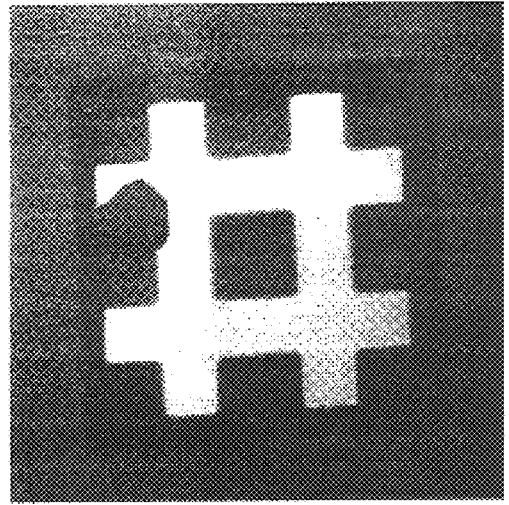
Figure 4C:
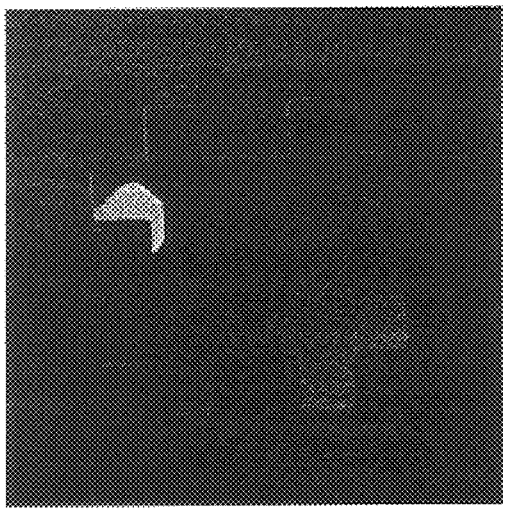
Figure 4D:
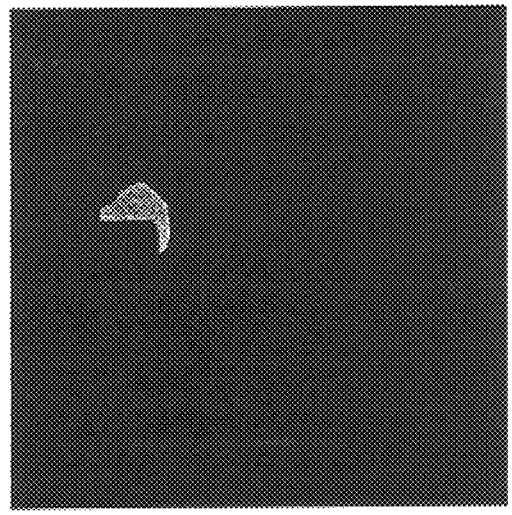

The following will describe experimental results of applying the illumination compensation system to improve the automatic visual inspection performance under varying illumination conditions. FIG. 3 depicts an example of visual inspection using the image subtraction approach. FIG. 3(*a*) is the reference image and FIG. 3(*b*) is an inspection image of the same object under a different illumination condition. A pattern alignment system was first applied to align these two images and estimate the uniform illumination scaling and bias factors. The pattern alignment system is described in U.S. patent application Ser. No. 08/993,850 entitled "A Method For Localization Refinement Of Pattern Images" filed on Dec. 18, 1997, assigned to the same assignee as the present invention and hereby incorporated by reference. Then the difference between the inspection image and the warped image is shown in FIG. 3(c). The difference image is non-trivial for the two images of the same object under different illumination conditions. FIG. 3(d) is the difference image for the illumination compensated inspection and reference images. This yields a nearly zero difference image. The spline-fitting based compensation system was applied. It is obvious that the present invention drastically improves the visual inspection result.

Another example is depicted in FIG. 4. FIG. 4(a) is the reference image and FIG. 4(b) is a defected inspection image. The difference image for the aligned inspection and reference image is shown in FIG. 4(c). It can be seen that there is some significant differences in the difference image in addition to the defect areas, which are due to the illumination variations between the two images. This problem is greatly improved by using the illumination compensation system of the present invention. As evident in FIG. 4(d), the significant differences between the illumination compensated inspection and reference images are restricted in the defect areas.

The present invention is an illumination compensation system that corrects smooth intensity variations due to illumination changes. By using the present invention as a pre-processing step in the image reference based inspection or localization, the image inspection or localization system is made more robust against spatially smooth illumination changes. The illumination compensation system is based on the assumption that the underlining image reflectance function is approximately a piecewise constant and the image irradiance function is spatially smooth. Reliable gradient constraints on the smooth irradiance function are computed and selected from the image brightness function by using a local uniformity test. The present invention includes an option of two surface fitting systems to recover the smooth image irradiance function from the selected reliable gradient constraints. One is a polynomial surface fitting system and the other is a spline surface fitting system. The spline surface fitting system leads to solving a large linear system, which is accomplished by an efficient preconditioned conjugate gradient system. Once the image irradiance function is estimated, the spatial intensity inhomogeneities can be easily compensated.

It is not intended that this invention be limited to the hardware or software arrangement or operational procedures shown disclosed. This invention includes all of the alterations and variations thereto as encompassed within the scope of the claims as follows.

What is claimed is:

1. A method for compensating for variations of illumination in an automatic visual inspection system, the method comprising the steps of:
   receiving image data;
   estimating an illumination component based on the image data;
   removing the estimated illumination component from the image data to provide illumination-compensated image data; and
   outputting the illumination-compensated image data to the visual inspection system for further processing,
   wherein the step of estimating an illumination component comprises the steps of:
      computing an image brightness function representing the image data, the image brightness function being the product of an irradiance function and a reflectance function; and
      estimating the irradiance function from the image data; and
   wherein the step of removing the estimated illumination component comprises the steps of:
      computing the reflectance function using the estimated irradiance function and the computed image brightness function, the computed reflectance function representing the illumination-compensated image data.

2. The method of claim 1, wherein the step of estimating the irradiance function comprises the steps of:
   performing a logarithmic operation on the image brightness function to provide a logarithmic image brightness function;
   deriving gradient constraints at locations inside regions of uniform reflectance values of the reflectance function using the logarithmic image brightness function, the reflectance function being approximated as a piecewise constant; and
   estimating a logarithmic irradiance function from selected ones of the gradient constraints using a surface fitting process; and wherein the step of computing the reflectance function comprises the steps of:
   subtracting the logarithmic irradiance function from the logarithmic image brightness function to provide a logarithmic reflectance function; and
   performing an exponential operation on the logarithmic reflectance function to obtain the illumination-compensated image data.

3. The method of claim 2, further comprising the step of selecting reliable gradient constraints at the locations inside regions of uniform reflectance.

4. The method of claim 3, wherein the step of selecting reliable gradient constraints comprises the step of using a local uniformity test that determines if pixels in a local neighborhood belong to a same region with a uniform reflectance value.

5. The method of claim 3, wherein the surface fitting process estimates the logarithmic irradiance function by utilizing the selected reliable gradient constraints and considering the logarithmic irradiance function as a spatially smooth function.

6. The method of claim 5, wherein the surface fitting method is one of a spline surface fitting method and a polynomial surface fitting method in which the irradiance function is approximated using a low order polynomial.

7. A system for compensating for variations of illumination in an automatic visual inspection system, comprising:
   an illumination estimator adapted to estimate an illumination component of received image data; and
   a compensator adapted to remove the estimated illumination component from the image data to provide illumination-compensated image data, wherein the illumination-compensated image data is output to the visual inspection system for further processing,
   wherein the illumination estimator comprises:
      means for computing an image brightness function representing the image data, the image brightness function being the product of an irradiance function and a reflectance function; and
      means for estimating the irradiance function of the image brightness function from the image data; and
   wherein the compensator comprises:
      means for computing the reflectance function using the estimated irradiance function and the computed image brightness function, the computed reflectance function representing the illumination-compensated image data.

8. The system of claim 7, wherein the automatic visual inspection system is configured as an image reference inspection system.

9. The system of claim 7, wherein the means for estimating the irradiance function comprises:
  means for performing a logarithmic operation on the image brightness function to provide a logarithmic image brightness function;
  means for deriving gradient constraints at locations inside regions of uniform reflectance values of the reflectance function using the logarithmic image brightness function, the reflectance function being approximated as a piecewise constant; and
  means for estimating a logarithmic irradiance function from selected ones of the gradient constraints using a surface fitting process; and wherein the means for computing the reflectance function comprises:
  means for subtracting the logarithmic irradiance function from the logarithmic image brightness function to provide a logarithmic reflectance function; and
  means for performing an exponential operation on the logarithmic reflectance function to obtain the illumination-compensated image data.

10. The system of claim 9, wherein the means for estimating the irradiance function further comprises means for selecting reliable gradient constraints at the locations inside regions of uniform reflectance.

11. The system of claim 10, wherein the means for selecting reliable gradient constraints implements a local uniformity test to determine if pixels in a local neighborhood belong to a same region with a uniform reflectance value.

12. The system of claim 10, wherein the means for estimating the logarithmic irradiance function implements the surface fitting method using the reliable gradient constraints, and considers the logarithmic irradiance function as a spatially smooth function for the estimation process.

13. The system of claim 12, wherein the surface fitting method is one of a spline surface fitting method and a polynomial surface fitting method in which the irradiance function is approximated using a low order polynomial.

14. A method for improving automatic visual inspection performance under varying illumination conditions, comprising the steps of:
  preprocessing an inspection image to provide an illumination-compensated inspection image, wherein the step of preprocessing the inspection image comprises the steps of estimating an illumination component of the inspection image, and removing the estimated illumination component from the inspection image to provide the illumination-compensated inspection image;
  aligning the illumination-compensated image with a corresponding reference image; and
  taking the difference between the illumination-compensated image and the reference image to provide a difference image.

15. The method of claim 14, further including the step of analyzing the difference image to determine if there are defects in an object of the inspection image.

16. The method of claim 14, wherein the step of estimating an illumination component comprises the steps of:
  computing an image brightness function representing the inspection image, the image brightness function being the product of an irradiance function and a reflectance function; and
  estimating the irradiance function from the inspection image; and wherein the step of removing the estimated illumination component comprises the steps of:
  computing the reflectance function using the estimated irradiance function and the computed image brightness function, the computed reflectance function representing the illumination-compensated inspection image.

17. A program storage device readable by a machine, tangibly embodying a program of instructions executable by the machine to perform method steps for compensating for variations of illumination in an automatic visual inspection system, the method steps comprising:
  receiving image data;
  estimating an illumination component based on the image data;
  removing the estimated illumination component from the image data to provide illumination-compensated image data; and
  outputting the illumination-compensated image data to the visual inspection system for further processing,
  wherein the step of estimating an illumination component comprises the steps of:
    computing an image brightness function representing the image data, the image brightness function being the product of an irradiance function and a reflectance function; and
    estimating the irradiance function from the image data; and wherein the step of removing the estimated illumination component comprises the steps of:
    computing the reflectance function using the estimated irradiance function and the computed image brightness function, the computed reflectance function representing the illumination-compensated image data.

18. The program storage device of claim 17, wherein the instructions for performing the step of estimating the irradiance function comprise instructions for performing the steps of:
  performing a logarithmic operation on the image brightness function to provide a logarithmic image brightness function;
  deriving gradient constraints at locations inside regions of uniform reflectance values of the reflectance function using the logarithmic image brightness function, the reflectance function being approximated as a piecewise constant; and
  estimating a logarithmic irradiance function from selected ones of the gradient constraints using a surface fitting process; and wherein the step of computing the reflectance function comprises the steps of:
  subtracting the logarithmic irradiance function from the logarithmic image brightness function to provide a logarithmic reflectance function; and
  performing an exponential operation on the logarithmic reflectance function to obtain the illumination-compensated image data.

19. A program storage device readable by a machine, tangibly embodying a program of instructions executable by the machine to perform method steps for improving automatic visual inspection performance under varying illumination conditions, the method steps comprising:
  preprocessing an inspection image to provide an illumination-compensated inspection image, wherein the step of preprocessing the inspection image comprises the steps of estimating an illumination component of the inspection image, and removing the estimated illumination component from the inspection image to provide the illumination-compensated inspection image;

aligning the illumination-compensated image with a corresponding reference image; and taking the difference between the illumination-compensated image and the reference image to provide a difference image.

20. The program storage device of claim 19, wherein the instructions for performing the step of estimating an illumination component comprise instructions for performing the steps of:

computing an image brightness function representing the inspection image, the image brightness function being the product of an irradiance function and a reflectance function; and estimating the irradiance function from the inspection image; and wherein the step of removing the estimated illumination component comprises the steps of:

computing the reflectance function using the estimated irradiance function and the computed image brightness function, the computed reflectance function representing the illumination-compensated inspection image.

21. The program storage device of claim 20, wherein the instructions for performing the step of estimating the irradiance function comprise instructions for performing the steps of:

performing a logarithmic operation on the image brightness function to provide a logarithmic image brightness function;

deriving gradient constraints at locations inside regions of uniform reflectance values of the reflectance function using the logarithmic image brightness function, the reflectance function being approximated as a piecewise constant; and estimating a logarithmic irradiance function from selected ones of the gradient constraints using a surface fitting process; and wherein the step of computing the reflectance function comprises the steps of:

subtracting the logarithmic irradiance function from the logarithmic image brightness function to provide a logarithmic reflectance function; and performing an exponential operation on the logarithmic reflectance function to obtain the illumination-compensated image data.

* * * * *